Sept. 24, 1929.   C. N. F. KNAPE   1,729,445
LUBRICANT RETAINING DEVICE
Filed April 30, 1927
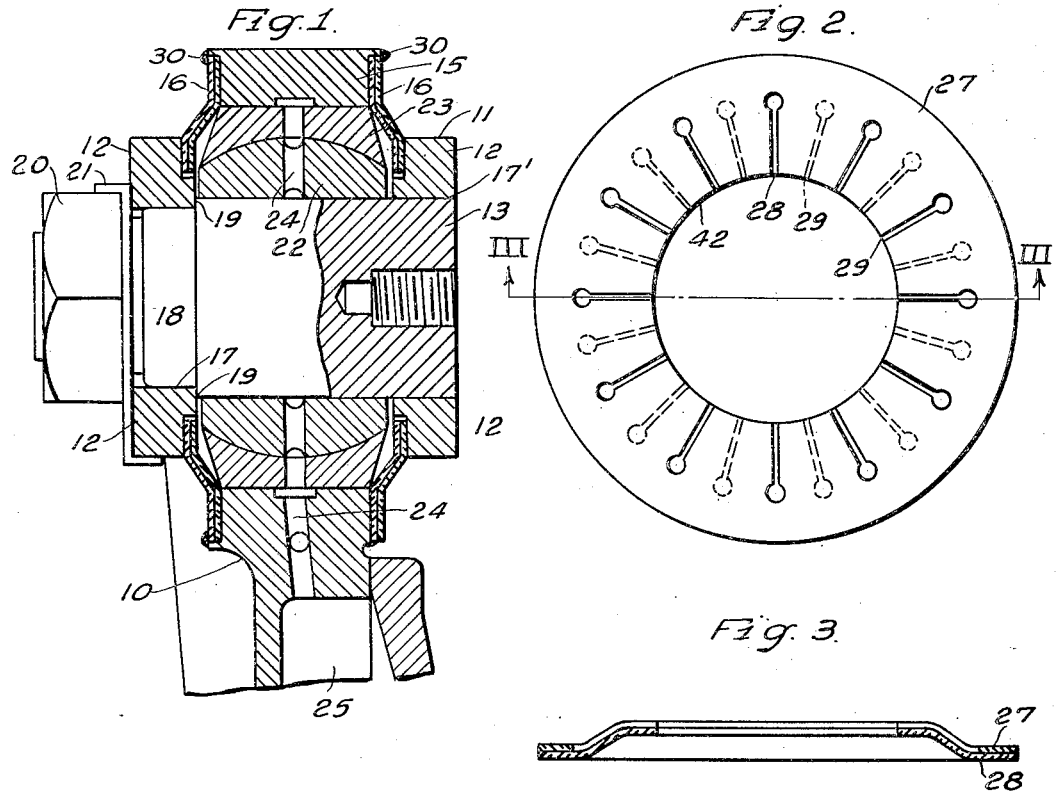
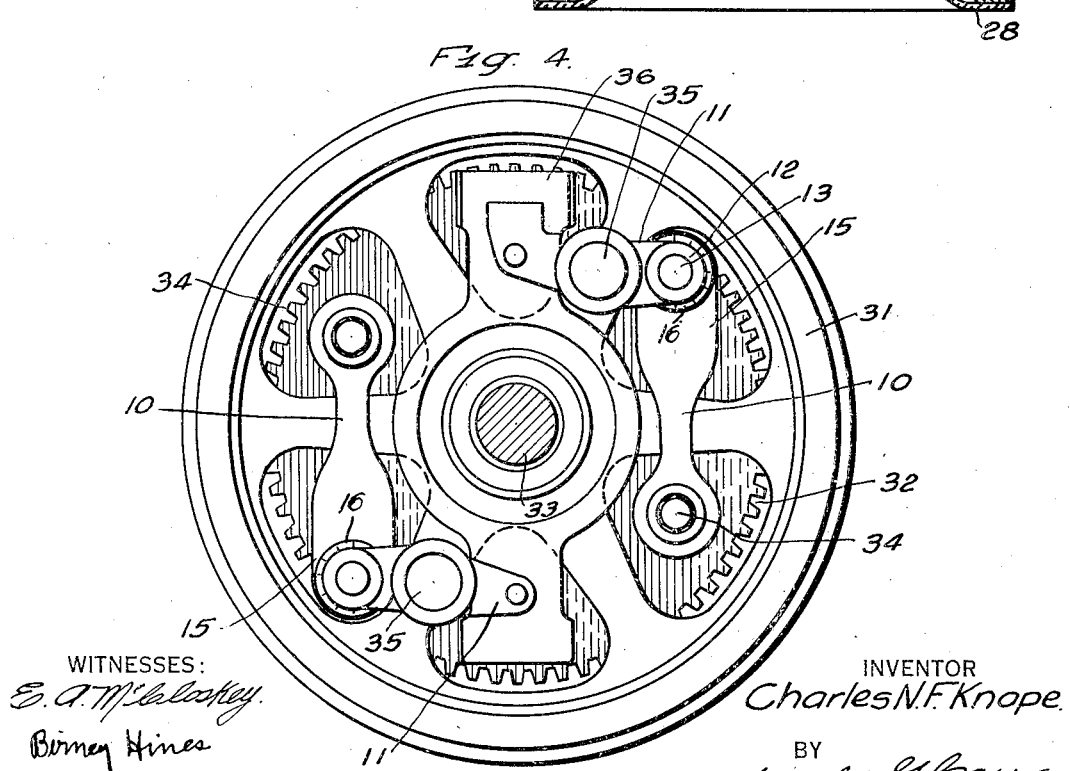
WITNESSES:
E. A. M'Closkey.
Birney Hines
INVENTOR
Charles N. F. Knape.
BY
Wesley G. Carr
ATTORNEY Patented Sept. 24, 1929

1,729,445

UNITED STATES PATENT OFFICE

CHARLES N. F. KNAPE, OF EAST PITTSBURGH, PENNSYLVANIA, ASSIGNOR TO WESTINGHOUSE ELECTRIC & MANUFACTURING COMPANY, A CORPORATION OF PENNSYLVANIA

LUBRICANT-RETAINING DEVICE

Application filed April 30, 1927. Serial No. 187,783.

My invention relates generally to lubricant-retaining devices and more particularly to lubricant-retaining devices for joints.

The object of the invention, generally stated, is the provision of lubricant-retaining devices that shall be simple and efficient in operation, and capable of being readily and economically manufactured.

It is also an object of the invention to provide means for preventing the escape of a lubricant such as grease or the like from joints.

Other objects of the invention will, in part, be obvious and will, in part, appear hereinafter.

The invention accordingly is disclosed in the embodiment thereof shown in the accompanying drawing and comprises the structural features and the combination of elements, and arrangement of parts which will be exemplified in the construction hereinafter set forth and the scope of the application of which will be indicated in the claims.

For a fuller inderstanding of the invention, reference may be had to the following detailed description taken in connection with the accompanying drawing, in which Figure 1 is a view in cross section of a joint provided with a lubricant-retaining device constructed in accordance with this invention;

Fig. 2 is a plan view of the lubricant-retaining device shown mounted on the joint illustrated in Fig. 1;

Fig. 3 is a view, in cross section, taken on the line III—III of the lubricant-retaining device illustrated in Fig. 2, and Fig. 4 is a view, in side elevation, showing the lubricant-retaining device illustrated in Fig. 1 applied to a locomotive drive mechanism.

In the drawing a joint requiring lubrication is illustrated as provided with lubricant-retaining means comprising, in general, a link or joint member 10, a lever or second joint member 11 joined to the link member by means of a bifurcated end or clevis 12 which is provided with a joint pin 13, and a pair of lubricant-retaining washers 16 that are held between the sides of the link or joint member 10 and the clevis 12.

The clevis 12, in which one end 15 of the link member 10 is located, is provided with alined openings 17 and 17' that are adapted to receive the joint pin 13. As shown, the openings 17 and 17' are of different sizes.

In order to prevent the joint pin 13 from working out of its operative position in the joint, the end 18 is made of less diameter than the main part of the pin to provide a shoulder 19 which bears against the inner wall of the clevice 12 when the joint pin is in operative position therein, with its smaller portion located in the opening 17, which is of less diameter than the opening 17'. The outer end of the small portion 18 of the pin is screw-threaded and a nut 20 and a lock washer 21 are mounted thereon to cooperate with the shoulder 19 to securely lock the joint pin in position in the joint.

While my improved lubricant-retaining means may be used in connection with various types of joints, it is particularly well adapted to the type of ball and socket joint I have illustrated, in which a ball member 22 is supported on the pin 13 and is disposed to move relative to a socket 23 that is supported in the link or joint member 10. The link or joint member 10, the socket member 23, and the ball member 22 are provided with lubricating ducts 24 through which a lubricant such as grease or oil may be supplied to the bearing surfaces from a reservoir 25.

In this particular embodiment of the invention the lubricant-retaining washers 16 comprises a pair of resilient dish-shaped members 27 and 28, each of which has provided in its inner periphery a plurality of radial slots 29. The members 27 and 28 are assembled in pairs in such manner that the slots 29 in one member are out of line with or in staggered relation to the slots 29 in the other member.

However, it is to be understood that the shape of the members 27 and 28 utilized in making the washers may be varied to adapt them to different joints. The link or joint member 10 is counter-sunk on each side to provide a seat 30 in which the lubricant-retaining washer may be mounted. As shown the washers 16 are disposed in such manner that the bowl-shaped portions, which are divided into a plurality of segments 42 by the slots 29, will extend outwardly. The clevis 12 is utilized to retain the washers 16 in position. Since the outwardly extending segments 42 of the washers are resilient, they may be distorted to accommodate the clevis. By reason of the fact that the members 27 and 28 are assembled as washers in the joint with their slots 29 in staggered relation so that the segments 42 of one disk cover the slots 29 of the other disk, practically no grease or lubricant can escape from the joint through the walls of the washer and inasmuch as the outer periphery of the washer is secured to the joint member 10 while its inner periphery presses against the joint member 11, practically all the lubricant introduced into the joint will be retained therein. The lubricant-retaining washer 16 is shown as welded to the link member 10 but it may be secured thereto by any other suitable means.

In order that the advantageous employment of the invention may be more readily understood, I have illustrated a structure in Fig. 4 in which several joints embodying my improved lubricant-retaining device are employed. The structure comprises an electric locomotive drive wheel 31 adapted to be driven through a gear wheel 32 that is mounted upon a quill (not shown) surrounding the axle 33 of the driving wheel 31. The gear wheel 32 is connected to the driving wheel 31 by a link mechanism comprising a pair of links 10, that are pivotally mounted on a pair of stud shafts 34, attached to the gear-wheel 32. A pair of levers 11 are mounted upon stud shafts 35 on the drive wheel 31 and have their outer ends connected to the links 10 by means of clevises 12 and joint pins 13, and their inner ends connected by a yoke member 36. It is desirable to employ a flexible connection between the gear wheel and the drive wheel and therefore it has been found desirable to use pivotal or ball and socket joints between the links, levers and gear wheel and thus provide the desired flexibility.

Inasmuch as drive wheels of the type illustrated rotate at high speed, it is necessary to provide special means for retaining in the joints such lubricant as is supplied thereto, and it has been found that the provision of my improved lubricant-retaining means in conjunction with the ball and socket joints is particularly desirable.

While the illustrated example constitutes a particular embodiment of my invention, I do not limit myself strictly to the details shown, since, manifestly, the same may be considerably varied without departing from the spirit of the invention as defined in the appended claims,

I claim as my invention:

1. A lubricant-retaining joint comprising a link and a lever provided with joint members, a pin for joining the joint members, and a pair of resilient members having slots in their inner peripheries, said resilient members being associated in such manner that the slots in one resilient member are in staggered relation to the slots in the other resilient member and having their outer portions secured to the link member in such position that their inner portions bear against the lever member.

2. A lubricant-retaining joint comprising a link and a lever provided with joint members, a pin for joining the joint members, and a pair of resilient dish-shaped members having slots in their inner peripheries, said dish-shaped members being nested with the slots in one dish-shaped member in staggered relation to the slots in the other dish-shaped member and having their outer portions secured to the link member in such position that their inner portions bear against the lever member.

3. A lubricant-retaining joint comprising a link and a lever provided with joint members, a pin for joining the joint members, and a pair of resilient dish-shaped members provided with slots in their inner peripheries, said dish-shaped members being mounted on said pin in side by side relation with the slots in one dish-shaped member in staggered relation to the slots in the other dish-shaped member and having their outer portions in contact with the link member and their inner portions in contact with the lever member.

4. A lubricant-retaining joint comprising a link member having a socket, a lever member, a ball member supported by the lever member, and a pair of resilient dish-shaped members having a plurality of slots in their inner peripheries said dish-shaped members being associated in such manner that the slots in one dish-shaped member out of line with the slots in the other dish-shaped member and having their outer portions fastened to the link member and their inner portions in contact with the lever member.

In testimony whereof, I have hereunto subscribed my name this 26th day of April, 1927.

CHARLES N. F. KNAPE.